United States Patent [19]

Nagle

[11] Patent Number: 5,644,204
[45] Date of Patent: Jul. 1, 1997

[54] ANTI-SLIP CONTROL FOR A LEGGED ROBOT AND REALISITC SIMULATION OF A LEGGED CREATURE

[76] Inventor: John Nagle, 999 Woodland Ave., Menlo Park, Calif. 94025

[21] Appl. No.: 333,654

[22] Filed: Nov. 3, 1994

[51] Int. Cl.$^6$ ..................................................... B25J 5/00
[52] U.S. Cl. .......................... 318/568.12; 901/1; 395/95; 318/568.18; 318/568.25
[58] Field of Search ........................ 318/568.12, 568.18, 318/568.25, 560, 565; 901/1, 8, 10, 30, 27, 33, 46, 48, 50; 395/152, 80, 85, 88, 95, 96; 345/122

[56] References Cited

U.S. PATENT DOCUMENTS

| | | |
|---|---|---|
| 4,834,200 | 5/1989 | Kajita . |
| 5,206,569 | 4/1993 | Ozawa . |
| 5,209,126 | 5/1993 | Grahn ........................................ 345/122 |
| 5,221,883 | 5/1993 | Takenaka . |
| 5,255,753 | 10/1993 | Nishikawa . |
| 5,483,630 | 1/1996 | Unuma et al. ............................. 395/152 |

OTHER PUBLICATIONS

Badler, N., Barsky, A., and Zeltzer, D., "Making them move: Mechanics, Control, and Animation of Articulated Figures", 1991, Morgan Kaufmann, ISBN 1–55860–106–6.

Caurin, G. and Tschichold–Gürman, N., "The Development of a Robot Terrain Interaction System for Walking Machines", in Proceedings of the 1994 IEEE Conference on Robotics and Automation, IEEE Computer Society Press, ISBN 0–8186–5330–2.

Craig, J., "Introduction to Robotics: Mechanics and Control", 1985, Addison–Wesley, ISBN 0–201–09528–9.

Hodgins, Jessica K. and Raibert, Marc H., "Adjusting step length for rough terrain locomotion", *IEEE Transactions on Robotics and Automation* vol. 7, #3, Jun., 1991.

Manko, D., "A General Model of Legged Locomotion on Natural Terrain", 1992, Kluwer, ISBN 0–7923–9247–7.

Marchand, G., 1994, "The Dinosaurs Are Among Us", *Pixel Vision*, No. 11, pp. 38–39.

Matsuoka, K., 1980, "A mechanical model of repetitive hopping movements", *Biomechanisms* vol. 5, pp. 251–258.

Raibert, M., "Legged Robots that Balance", 1986, MIT Press, ISBN 0–262–18117–7.

Raibert, M. and Hodgins, J., "Animation of Dynamic Legged Locomotion", *Computer Graphics*, vol. 25, #4, Jul. 1991.

*Primary Examiner*—Karen Masih
*Attorney, Agent, or Firm*—Townsend and Townsend and Crew LLP

[57] ABSTRACT

A control system for a dynamic legged running machine, with improvements to improve stability by preventing or limiting foot slippage. The transverse force applied to a foot in contact with the ground is limited to a value below that at which slipping would occur. A method of operating a three-jointed leg is also provided so that balance and slip control is improved. Applications include legged mechanical robots and simulations of legged machines, animals, or humans.

22 Claims, 14 Drawing Sheets

ANTI-SLIP CONTROL FOR A LEGGED ROBOT AND REALISITC SIMULATION OF A LEGGED CREATURE

BACKGROUND OF THE INVENTION

This invention is related to the field of robotics, and, more particularly, to a method for controlling a legged robot so that the robot is capable of walking and running over terrain containing hills and over surfaces affording limited traction. The invention is also related to the realistic animation of legged creatures walking and running over rough terrain.

Much prior art concerning legged mechanical devices, including robots, exists. These approaches have been capable of statically stable walking only.

However, the prior art for the dynamic locomotion of robots is sparse. In the late 1970s, a laboratory apparatus for studying hopping with active control of balance was made and was the first successful device which operated with dynamic legged locomotion. Subsequently the first successful running machines were described. These machines are designed to work on flat surfaces affording good traction and are incapable of negotiating an irregular or slippery surface during legged running. In passing, the term, "running," is used herein in the conventional sense, i.e., a motion such that all the legs of the creature/animal/robot are off the ground at the same time.

Some development of dynamic control of legged machines over rough terrain has occurred. There has been some work on slip control of legged machines on difficult surfaces. However, all of this work is basically conservative in approach, suitable only for slow, careful walking.

Even in the computerized animation of legged creatures, automated slip control for a more realistic representation of running has not been developed. For example, Badler, N., Barsky, A., and Zeltzer, D., "Making them Move: Mechanics, Control, and Animation of Articulated Figures", 1991, Morgan Kaufmann, ISBN 1-55860-106-6, a book-length overview of animation of legged creatures, fails to mention any slip control for the animated figures. In the movie, Jurassic Park, the animated dinosaurs were not animated using physically-based modelling techniques. Rather, the motion of the dinosaurs was manually adjusted to the terrain with computers "drawing" the creatures after the adjustment. The most advanced physically-based animation of legged running appears to be for flat ground, with occasional hops over small obstacles. The problems introduced by slippery surfaces or hills is not addressed.

The present invention solves or substantially mitigates these problems. With the present invention, legged robots are capable of running over hills and slippery surfaces. Furthermore, the present invention provides for the realistic operation of a robotic leg which is jointed similarly to animal legs. Finally, the animation of legged creatures is made more efficiently and more realistic. Leg slip and movements over inclined slopes are automatically determined in accordance with the present invention for realistic simulations. Realistic effects are enhanced with the simulated operation of legs jointed similarly to animal legs.

SUMMARY OF THE INVENTION

The present invention provides for a control system and method of operation for a dynamic legged running machine, including but not limited to legged machines with one, two, or four legs. The control system prevents, limits, or recovers from foot slippage and hence improves stability. Foot slippage is avoided by limiting the transverse force applied to a foot in contact with the ground to a value below that at which slipping would occur. This value varies with the leg angle to the ground, the force applied to the foot normal to the ground, and the friction of the ground surface, and may be adjusted separately for each leg. The robustness of legged locomotion is substantially improved over the prior art. Previous legged machines using dynamic balance generally fall if operated in a situation where slipping is possible. Machines using the present invention are able to run without falling on moderately hilly or slippery surfaces.

Another aspect of the present invention is a method of operating articulated legs having "hip", "knee", and "ankle" joints. The articulated leg is constrained to operate like a leg rod having one end connected to the "toe" of the articulated leg. The rod is coupled to a rotating balance joint which is capable of sliding along a track fixed to the body attached to the articulated leg. The operations of positioning the rotating balance joint along the track, rotating the balance joint, and moving the rod with respect to the balance joint change the moment imparted by the leg as it exerts forces against the ground. This allows a controlled application of moment to the body for balance control. The constraint also creates a realistic appearance and movement of the articulated leg with respect to the body.

Still another aspect of the present invention is a system and method of simulating a legged machine, animal, or human in a computer-simulated environment, in a computerized system for creating animated images of legged creatures or in a video game which includes legged figures. The simulated motion of legged figures produced by the anti-slip control system and method of operation, or by the method of operating the articulated leg having the three joints described above, is physically realistic and produces animations in which the motions appear lifelike.

DETAILED DESCRIPTION OF PREFERRED EMBODIMENTS

Figure 1:
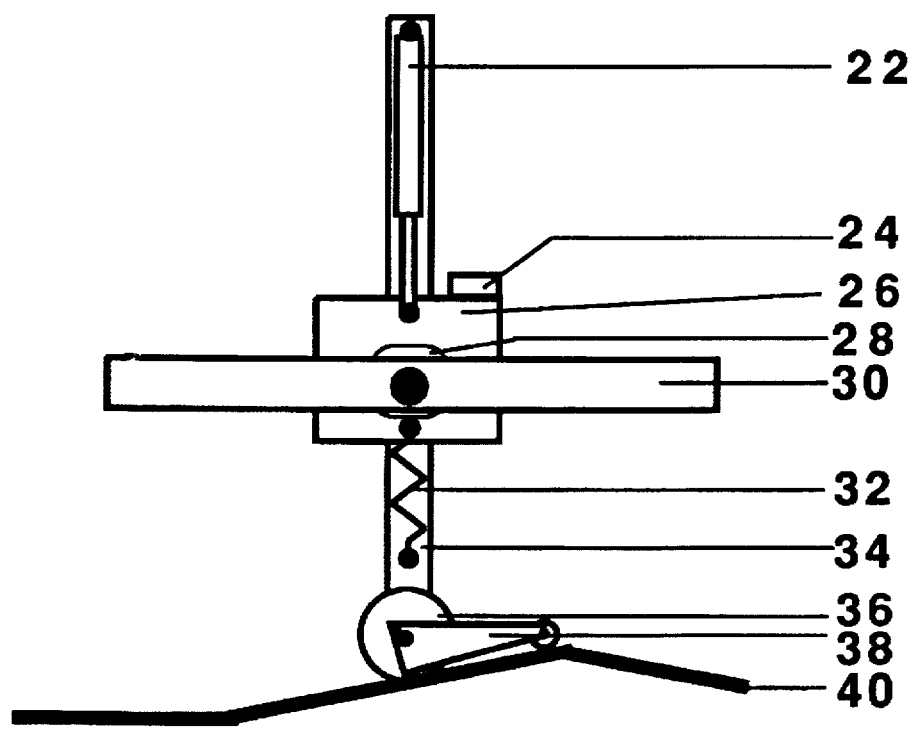
FIG. 1 is a diagrammatic drawing of the planar hopper according to one embodiment of the present invention.

To best illustrate the slip control of the present invention, an embodiment of the invention is explained with reference to a one-legged planar running/hopping machine as illustrated in FIG. 1. The hopper is a minimal legged locomotion system, a one-legged hopping machine constrained to operate in a plane. This embodiment is physically similar to the planar hopper as described in the prior art.

It is readily evident that this pogo-stick like machine is top-heavy and unstable. Without control it falls. This machine has no statically stable gaits; there is no way to make this machine walk or run without an active control system. With four or more legs, or with two legs and big feet, statically stable walking is possible. In statically stable gaits, like those of wind-up legged toys, the center of mass remains over the support area of the feet at all times. The one-legged machine does not have that option.

Any gait for a one-legged machine with a small ground contact area must be a dynamic gait, that is, one using an active control system and actuators to maintain balance. This is the most difficult case for legged locomotion. If a control system can operate this one-legged running machine on difficult terrain, the hardest problems of legged locomotion have been solved. The control system of the invention provides such control.

The hopper has a "body" 26 which slides up and down on the "leg" 34. This motion is sprung by a compression spring 32 and powered by a linear leg actuator 22. A "foot" 36 is attached to the leg 34, contacting the ground 40. A balance arm 30 is attached to the body 26 via a rotational joint and balance servomotor 28.

The machine includes a number of sensors. Integral to the linear actuator 22 are position and velocity sensors. Integral to the balance servomotor 28 are rotational position and velocity sensors. The "heel" 36 contains a force sensor which senses the vertical force between the foot and ground. An attitude sensor system 24 senses the attitude of the body 26 with respect to gravity, using standard inertial measurement techniques. A passive foot assembly 38, described in more detail in FIG. 2, is used to sense the angle between the leg 34 and ground 40.

Figure 2:
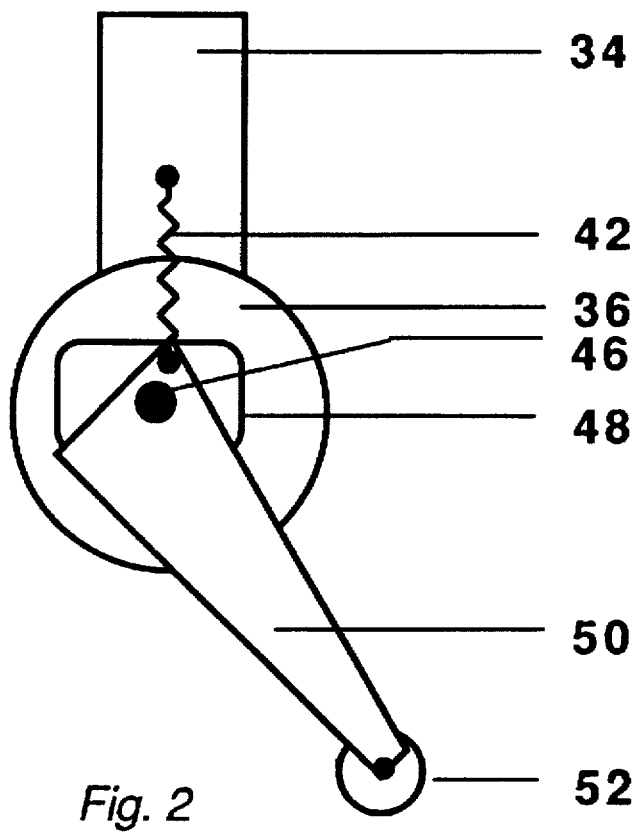
FIG. 2 is a detail of the "ankle" and "foot" of the planar hopper of FIG. 1.

The assembly shown in FIG. 2 is a passive sensing device, which is attached to the leg 34 and rounded heel 36 at a pivot 46. The foot 50 ends with a rounded toe 52. An angle sensor 48 senses the angle of the foot; the sensor is calibrated such that when the foot is on a horizontal surface and the leg is vertical, the sensor reads zero. A return spring 42 acts to return the ankle to the neutral position illustrated in FIG. 2. The heel 36 is constructed of a resilient material offering a high coefficient of friction, such as rubber, so as to give the foot good traction. The toe 52 is constructed of a material offering a low coefficient of friction to avoid tripping.

Hopping is divided into four basic phases: flight, landing, stance, and takeoff. Simple control during flight and stance is sufficient for hopping on flat terrain, as the prior art has demonstrated.

Figure 3:
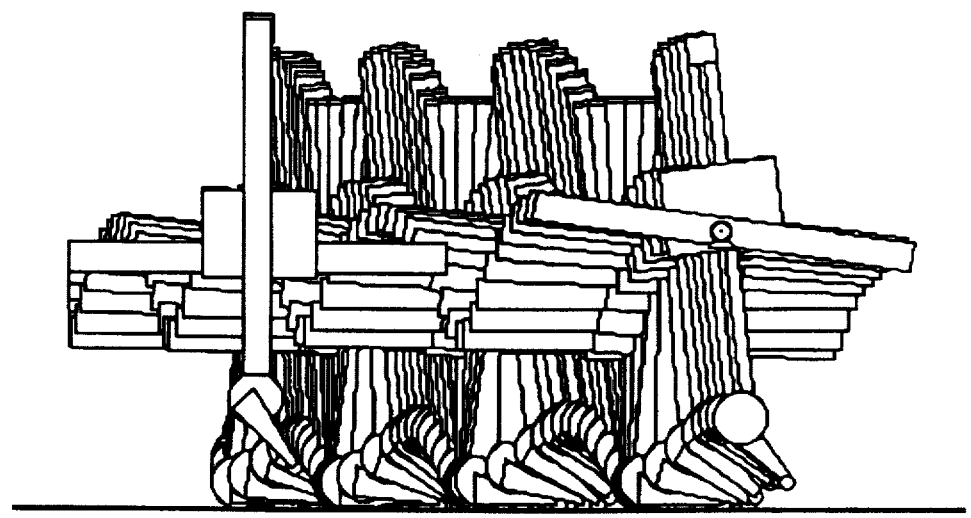
FIG. 3 illustrates the sequential motion of the planar hopper on flat ground.

The basic control operations are simple: during stance (the foot-solidly-on-ground phase), level the balance arm; during flight, align the leg with the motion vector anticipated at landing. Travel direction and speed are controlled by biasing the leg angle during flight. FIG. 3 illustrates these basic operations in action on level ground. The hopper is moving from left to right, and the outline of the hopper has been drawn every 50 ms. Note how the balance arm moves; the alignment of the leg during flight requires that the balance arm, as a reaction mass, be displaced from level, and the re-levelling of the balance arm during stance forces the body and leg to lean forward, placing them in position for the next stride. It is the alternation of these two control strategies that makes running possible.

Figure 4:
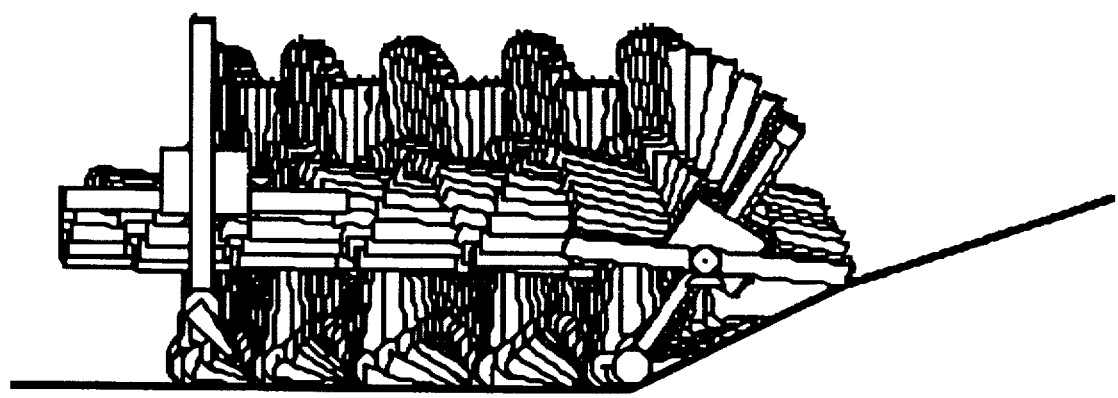
FIG. 4 illustrates the sequential motion of the planar hopper climbing a hill without the anti-slip control according to the present invention.

The description above is consistent with the prior art. However, the prior art control system is not capable of running on hills or slippery surfaces. FIG. 4 illustrates the results of trying a prior art controller, i.e., a controller without the benefit of this invention, on hilly terrain. The hopper slips and falls when it starts to climb the hill.

With the present invention an anti-slip controller is introduced. The anti-slip controller limits the torque applied to the balance servomotor 28 such that the transverse force applied by the foot 36 to the ground does not overcome the friction of the foot 36 on the ground. This prevents the foot 36 from slipping during the stance phase.

Figure 5:
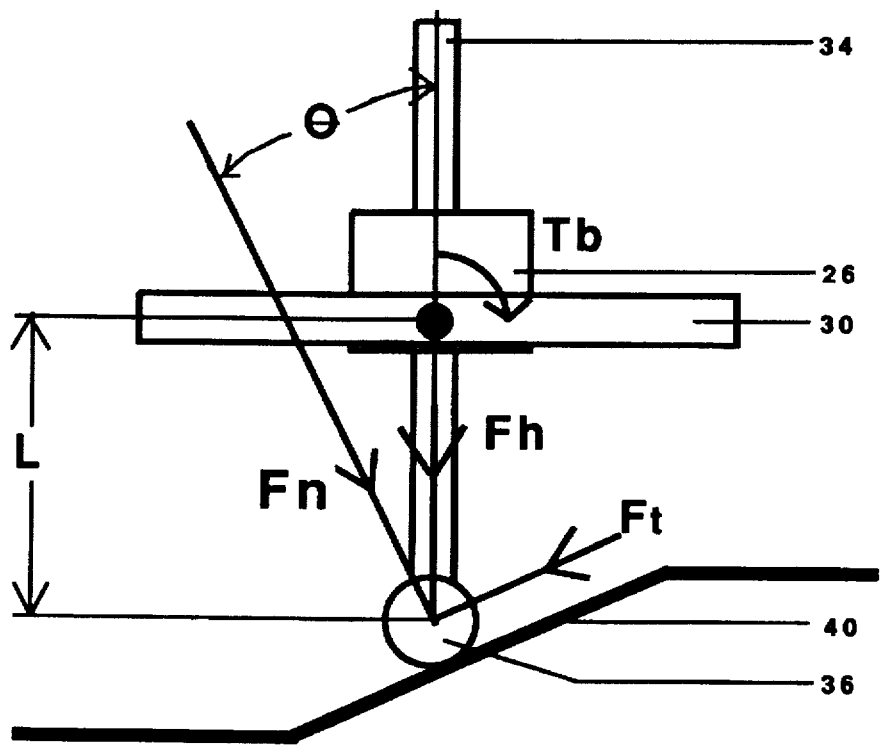
FIG. 5 illustrates the forces and torques acting on the planar hopper in contact with the ground.

The balance servomotor torque limits are calculated as follows, with reference to FIG. 5. The foot/ground contact has a static friction coefficient K. Slipping occurs unless the control system keeps the tangent component of the foot contact force vector $F_t$ below $KF_n$, where $F_n$ is the normal component of the foot contact force vector.

The length of the "leg", L, is a sensor input. The torque applied by the balance drive servo, $T_b$, and the force applied by the hop actuator, $F_h$, are actuator outputs. For simplicity, the foot and leg are assumed to be massless in this calculation. This assumption causes the estimates of $F_h$ to be on the low (safe) side, and thus the effect of gravity is subsumed into $F_h$ and $T_b$. The leg tilt with respect to the ground normal is the angle $\theta$ (in radians), and is obtained from the angle sensor 48 as shown in FIG. 2. From this available information, $F_t$ and $F_n$ are calculated:

$$F_t = \frac{L}{K} \cdot T_b \cdot \cos(\theta) + F_h \cdot \sin(\theta)$$

$$F_n = F_h \cdot \cos(\theta) - L \cdot T_b \cdot \sin(\theta)$$

which leads to the constraint $$T_b < \frac{KF_h}{L} \cdot \frac{(-\sin(\theta) + \cos(\theta))}{(\cos(\theta) + \sin(\theta))}$$

There is a corresponding constraint for slopes in the other direction.

$$T_b > \frac{KF_h}{L} \cdot \frac{\sin(-\theta) - \cos(-\theta)}{\cos(-\theta) + \sin(-\theta)}$$

Figure 6:
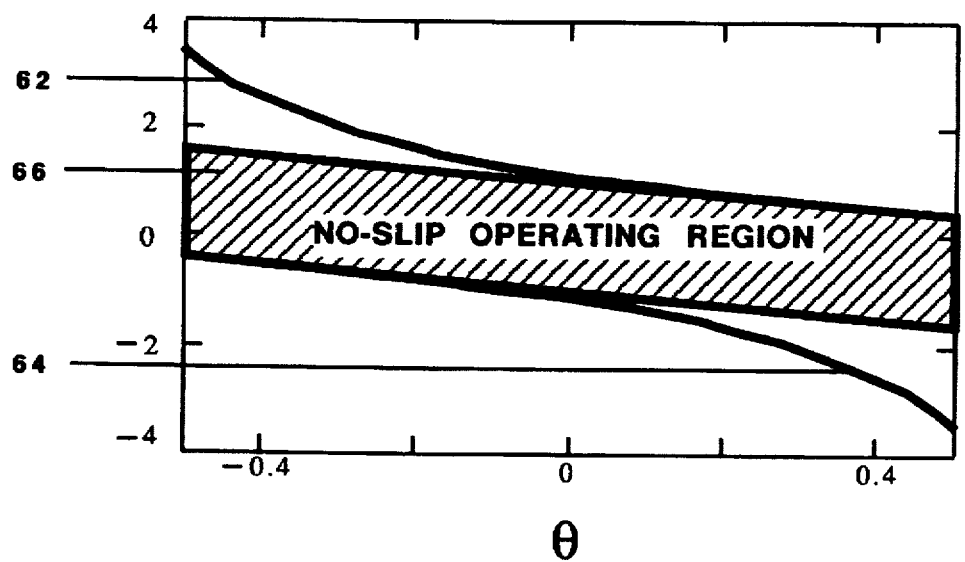
FIG. 6 is a graph of the torque limits versus the leg angle of the planar hopper.

If the terms of the last two equations depending on θ are graphed over the area of interest, as shown in FIG. 6, it becomes clear that a simple linear approximation over the region of interest is sufficient for control purposes. In FIG. 6, the curve 62 represents the upper limit for $T_b$, before applying the scale factor $F_h/L$, and the lower curve 64 similarly represents the lower limit, as defined by the two equations above. For practical purposes, a linear approximation to the curves 62 and 64, shown as the no-slip operating region 66, is sufficient to provide anti-slip control. So the anti-slip controller is designed to limit the balance torque to the range $$T_b < \frac{F_h}{L} \cdot (-1.2 \cdot \theta + 1) \cdot K \quad T_b > \frac{F_h}{L} \cdot (-1.2 \cdot \theta - 1) \cdot K$$

Figure 10A:
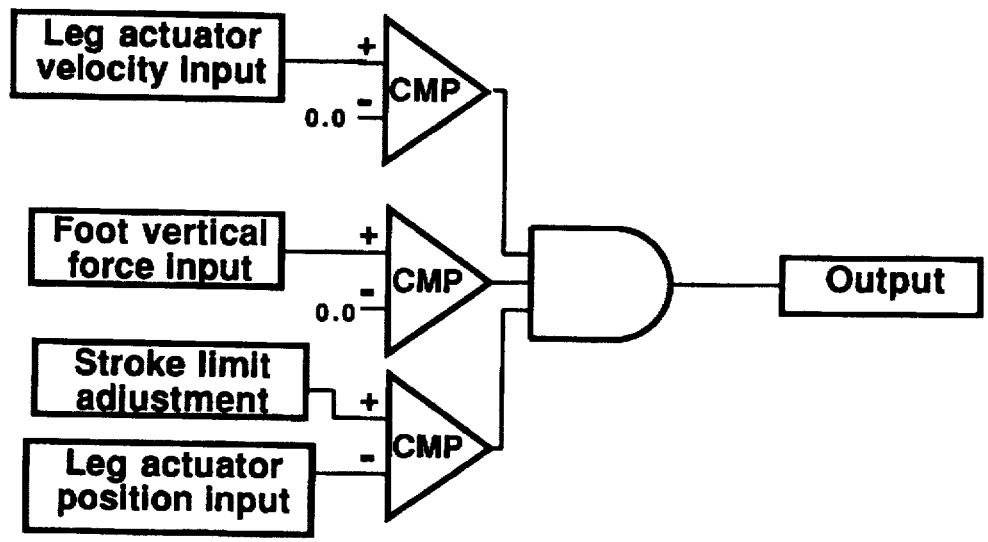
FIG. 10A is a detailed block diagram of the hop actuator controller of FIG. 9.
Figure 10C:
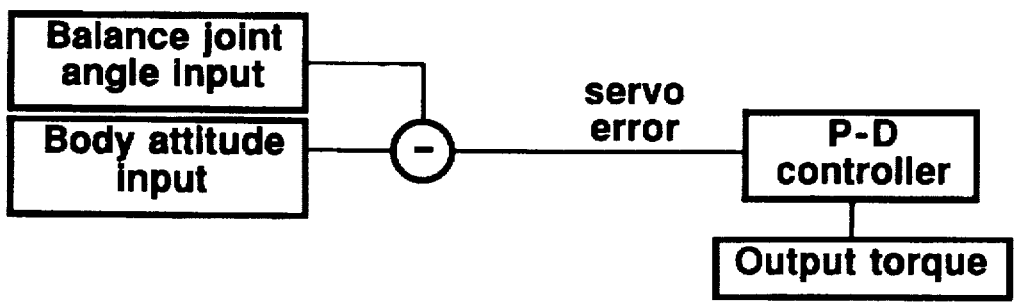
FIG. 10C is a detailed block diagram of the stance phase controller of FIG. 9.
Figure 10B:
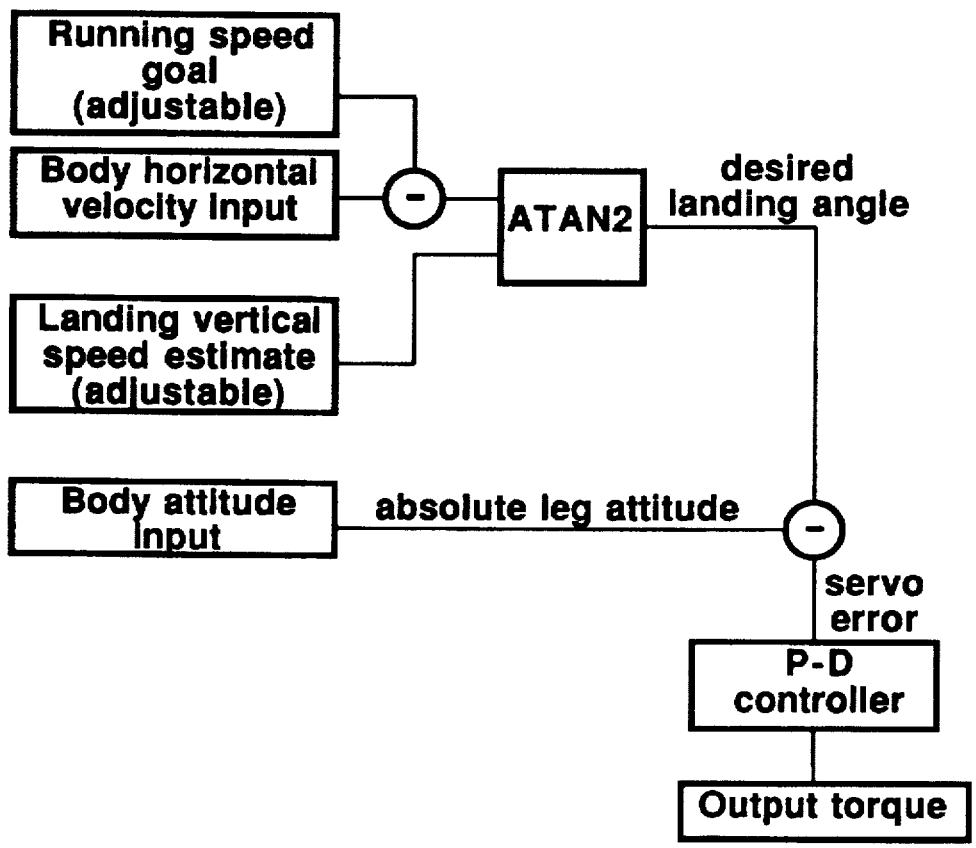
FIG. 10B is a detailed block diagram of the flight phase controller of FIG. 9.
Figure 10D:
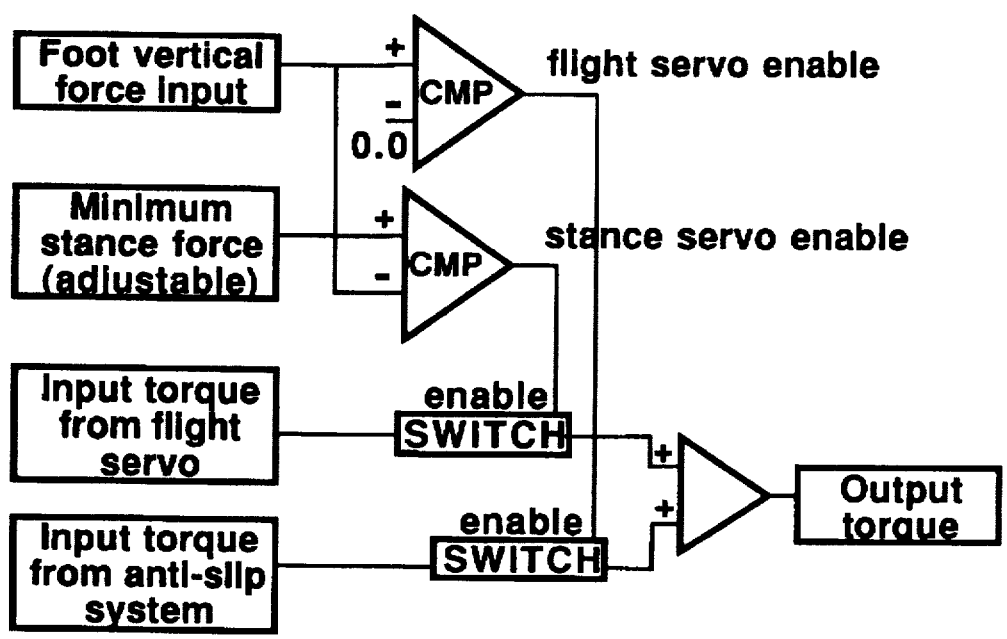
FIG. 10D is a detailed block diagram of the flight/stance mode switch controller of FIG. 9.
Figure 10E:
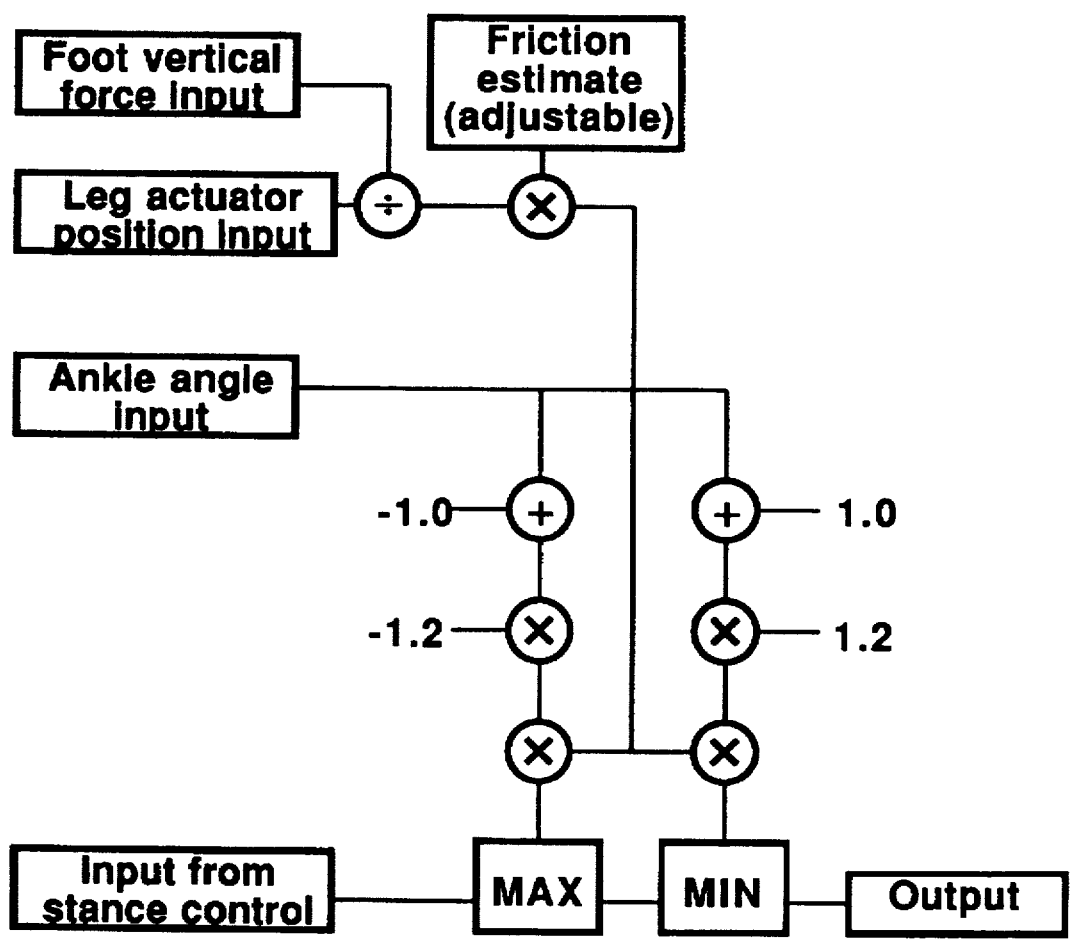
FIG. 10E is a detailed block diagram of the anti-slip control system of FIG. 9.

The anti-slip controller is thus a simple constrained controller which implements the balance torque limits, as shown in FIG. 10E. In the control hierarchy, the anti-slip system is below the basic locomotion controller, and limits its authority.

The friction coefficient estimate K is adjusted manually. Alternatively, an adaptive friction estimator can be used to automatically determine K. This slowly increases the estimated friction coefficient until slip occurs, then backs it off by a factor larger than the usual ratios between static and sliding friction. A factor of 2 appears suitable. Automatic adjustment not only provides friction estimation, but slip recovery. Once slip is detected, leg forces are sharply reduced, repeatedly if necessary, until slip stops. A force-sensing unit between the "leg" and "ankle", akin to the force-sensing wrist devices used on robot manipulators, detects slip, as well as providing an alternative means for measuring $F_h$. The planar hopping machine thus uses a 2-axis force sensing unit, the axes being normal and tangent forces.

The anti-slip controller inputs and outputs are all local to the leg system. No input from body attitude or balance sensors is required.

Figure 7:
FIG. 7 illustrates the sequential motion of the planar hopper running on a slippery surface with the anti-slip control according to the present invention.
Figure 8:
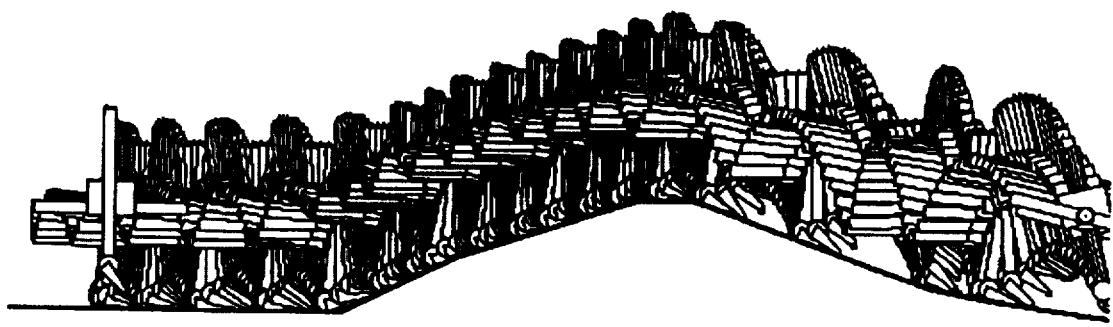
FIG. 8 illustrates the sequential motion of the planar hopper running on hilly terrain with the anti-slip control according to the present invention.
Figure 9:
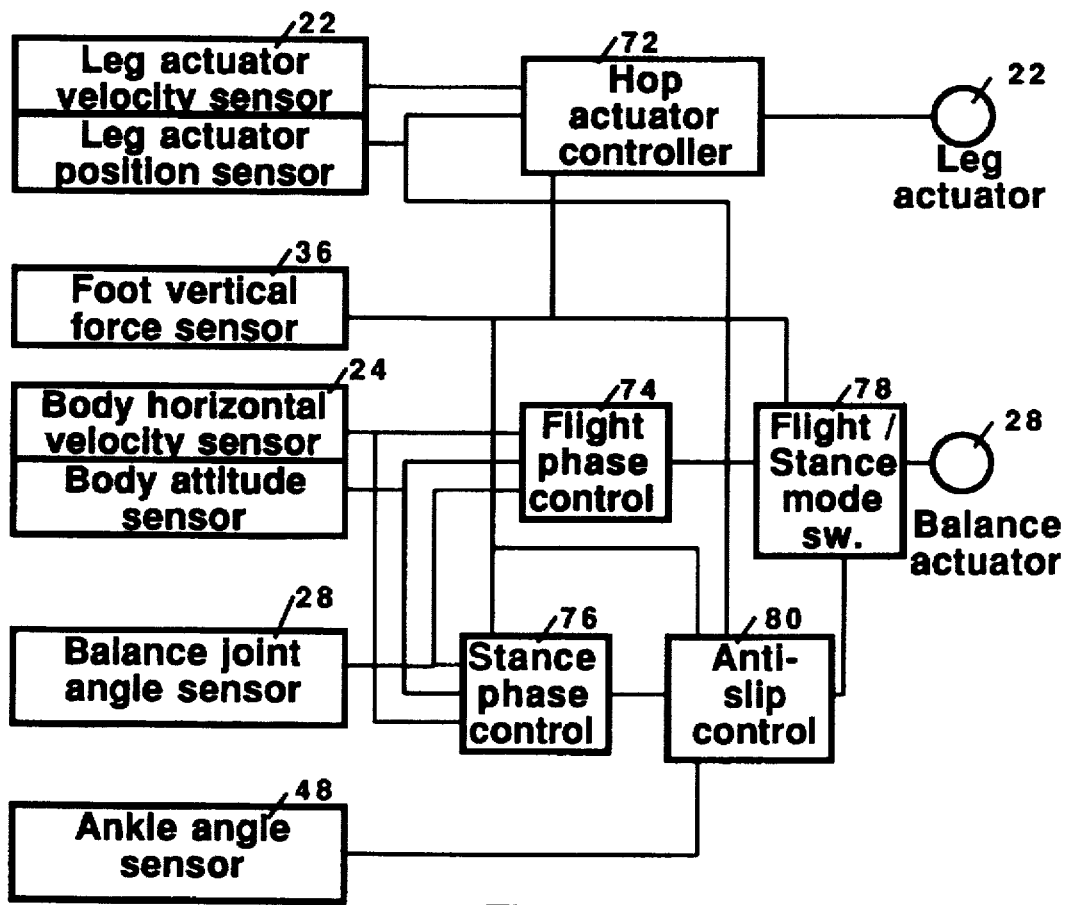
FIG. 9 is a block diagram of the general control system according to the present invention.

The effect of the invention is to enable running on slippery surfaces, as shown in FIG. 7, or on hilly terrain, as shown in FIG. 9. Compare FIG. 8 with FIG. 4; FIG. 4 is the same hopper on the same hill, but without the anti-slip controller. The hopper cannot climb the hill; the foot slips and slides back, then the body falls forward. FIG. 7 illustrates running on a surface with a coefficient of friction of 0.05, corresponding to running on ice. Note that the stride length and balancing behavior of the machine changes in response to conditions. This is the effect of the anti-slip system acting to override the balancing servo system.

Addition of the anti-slip control system to a legged machine thus substantially improves the stability of the machine on difficult terrain. This effect is to a considerable extent independent of the particular anti-slip control strategy used. It is primarily the presence of an anti-slip system as a low-level control loop, below the balance control system, which provides the improvement in stability.

To implement anti-slip control system described above, an embodiment is illustrated in FIGS. 9, 10A through 10E. The control system is composed of standard control elements.

FIG. 9 is an overview of the controller. The inputs to the controller are the position and velocity sensors associated with the leg actuator assembly 22, the foot vertical force sensor associated with the "heel" 36, the attitude sensor system 24, the body horizontal velocity (computed from the hopping stride length, hop rate, and angular rate from the attitude sensor system 24), the angle sensor associated with the balance servomotor assembly 28, and the ankle angle sensor 48. The outputs of the controller are the force to be applied by the leg actuator 22 and the torque to be applied by the balance servomotor 28.

FIGS. 10A through 10E are detailed block diagrams of the individual blocks of FIG. 9. FIG. 10A is a detail of the hop actuator controller 72, which determines when the leg actuator is to exert a force. Rather than the state machine used by the prior art, this embodiment uses inputs from the foot vertical force sensor in the heel 36, and the position and velocity sensors associated with the leg actuator 22 to determine when to enable the leg actuator.

FIG. 10B is a detail of the flight phase controller 74, which is basically a standard proportional-derivative (P-D) controller. The flight P-D controller orients the leg 34 to the desired landing angle relative to the vertical.

FIG. 10C is a detail of the stance phase controller 76, another standard P-D controller. The stance phase controller levels the body 26 of the hopper.

FIG. 10D is a detail of the flight/stance mode switch 78. The flight and stance controllers alternately control the balance servomotor 28; the mode switch determines which controller actually has authority over the actuator. Which controller has authority is determined solely by the signal from the foot vertical force sensor in the heel 36.

FIG. 10E is a detail of the anti-slip controller 80. This unit intercepts the output of the stance phase controller and limits the range of its output so as to prevent or limit foot slippage. The calculations described above are performed to compute the maximum and minimum allowed torques. The input signal from stance control is then limited to those bounds. The friction estimate is in this embodiment a manual adjustment. Note that all angles are expressed in radians.

For a running machine one meter high, about 1 stride per second is observed. This is a rather slow controller by current standards. The control loops are run with large errors at the beginning of each phase, with the gains adjusted to bring the error to zero only near the end of the phase, resulting in "soft" control loops that work with the dynamics of the mechanical system, rather than fighting them.

The invention has been described in terms of a one-legged machine for simplicity. The anti-slip system, being a per-leg control system with each leg controlled independently, is appropriate to a machine with any number of legs. Extension to multiple legs is straightforward, following the methods of leg coordination taught by the prior art. A multi-legged three-dimensional machine requires an independent, active balance, anti-slip controller for each leg, with a 3-axis force-sensing unit for each leg, sensing two dimensions of tangent forces.

Figure 11:
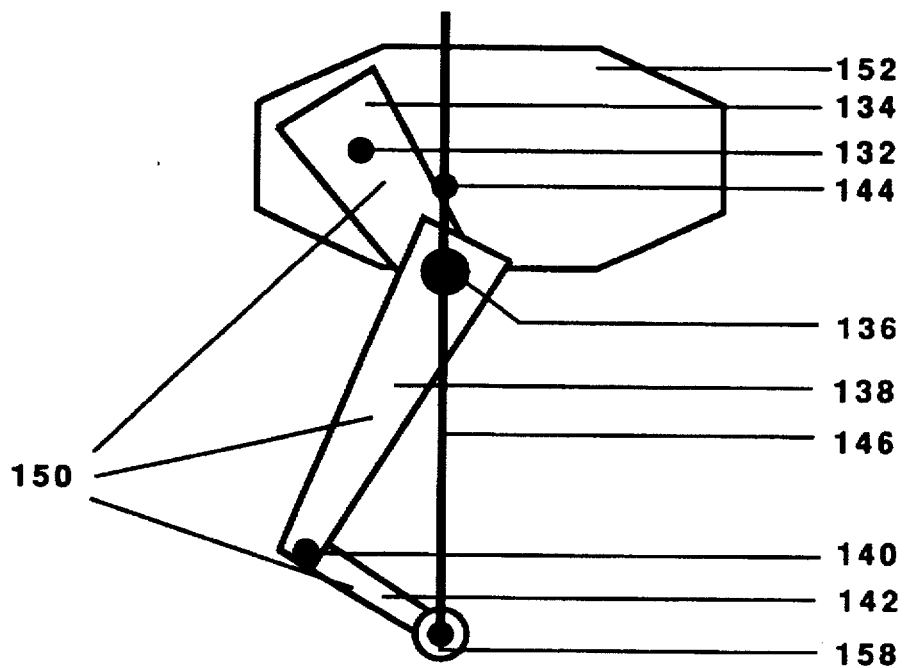

The present invention can also be generalized to more animal-like legged machines. FIG. 11 illustrates such an attempt in the prior art. A leg 150 with "hip" 132, "knee" 136, and "ankle" (or hock) 140 joints is attached to a body 152. The skeletal geometry shown is that of a kangaroo. These action of these joints are constrained through the use of a mental construct, a simplified leg line 146 and a rotating balance joint 144. The simplified leg line 146 and balance joint 144 are not physically present; they exist only as geometric construction lines to determine the position of the actual joints. Stated differently, the leg 150 with its hip joint 132, knee joint 136 and ankle joint 140 can be replaced by the simplified leg 146, a rod, and the balance joint 144, which can rotate with respect to the body 152. Once the leg angle and length values are determined, the hip joint 132 is operated by a servo to place the knee 136 in line with the simplified leg 146, and the knee 136 and ankle 140 joints are moved to place the foot 158 at the end of the simplified leg 146, using inverse-kinematics techniques for robot joint control. These techniques are standard in the field of robotics.

While the leg 150 appears to be a more realistic representation of an articulated animal leg, the simplified leg line 146 of FIG. 11 is nonetheless constrained to pass through the fixed balance joint 144, which was located at the center of gravity of the body. Thus forces exerted along the simplified leg line 146 apply no moment to the body, and thus do not impart pitch motions to the body. It should be noted that the representations of the movement of the one-legged hopper in FIG. 8 is a simulation of the movement of a legged "creature" and the description above of the mechanism illustrated in FIG. 11 is consistent with this prior art.

Figure 12:
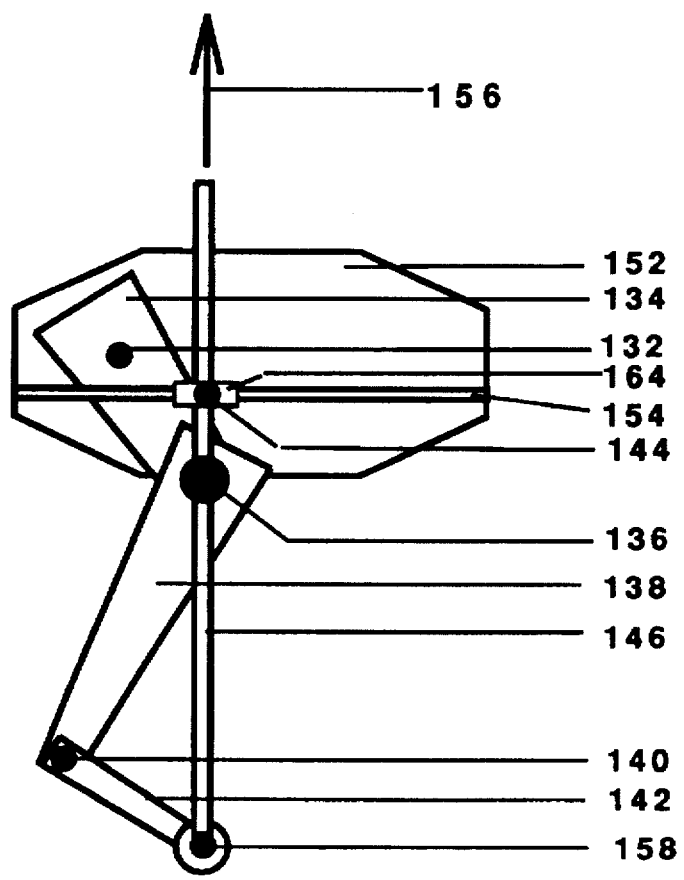
FIG. 12 is a diagram of an articulated leg according to the present invention.

The present invention provides for an improvement to the mechanism of FIG. 11, as illustrated in FIG. 12. An additional sliding joint 164 is added which allows the balance joint 144 to slide along a track 154. Thus provides an additional degree of freedom which allows the simplified leg line 146 to be tilted forward and backward. The effect of the motion of this additional degree of freedom is to change the moment imparted by the leg as it exerts forces against the ground. This allows the controlled application of moment to the body for the balance control.

Figure 13A:
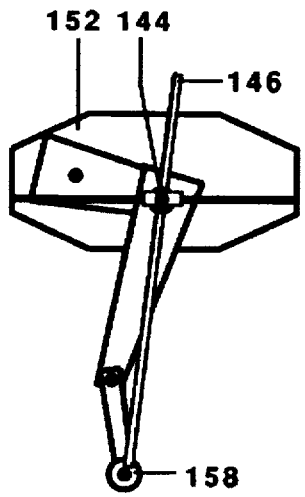
FIGS. 13A–13C illustrate the motion of the sliding balance joint in the articulated leg of FIG. 12.
Figure 13B:
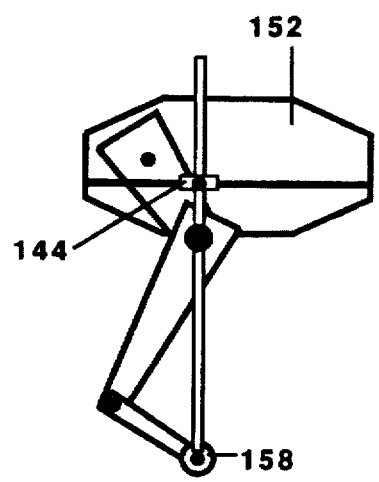
Figure 13C:
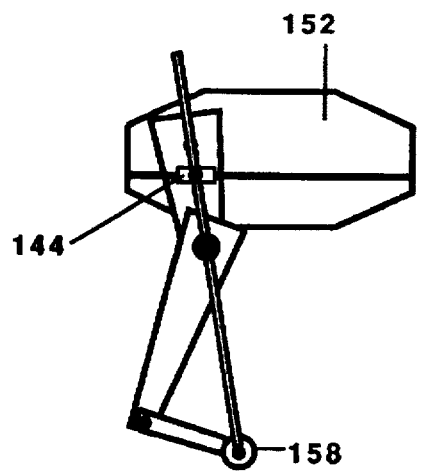

FIGS. 13A, 13B, and 13C illustrate how the additional sliding motion of the balance joint 144 along the track 154 is used to change the moment applied to the body. In these drawings, the body 152 and the foot 156 are in the same position, but the rotating balance joint 144 has been placed in different positions along the track 154, and thus the direction of the simplified leg line 146 is ahead of the center of gravity of the body 152 and a pitch-up moment is thus imparted; in FIG. 13B the leg force is applied in a line through the center of gravity of the body 152 and thus no moment is imparted, and in FIG. 13C, the simplified leg line 146 is behind the center of gravity at the pivot point and thus a pitch-down moment is imparted to the body 152. Thus control of the horizontal position of the balance joint 144 along the track 154 controls the moment applied to the body as the leg thrusts upward, allowing balancing torques to be applied to the body as required for the control of balance.

Figure 14:
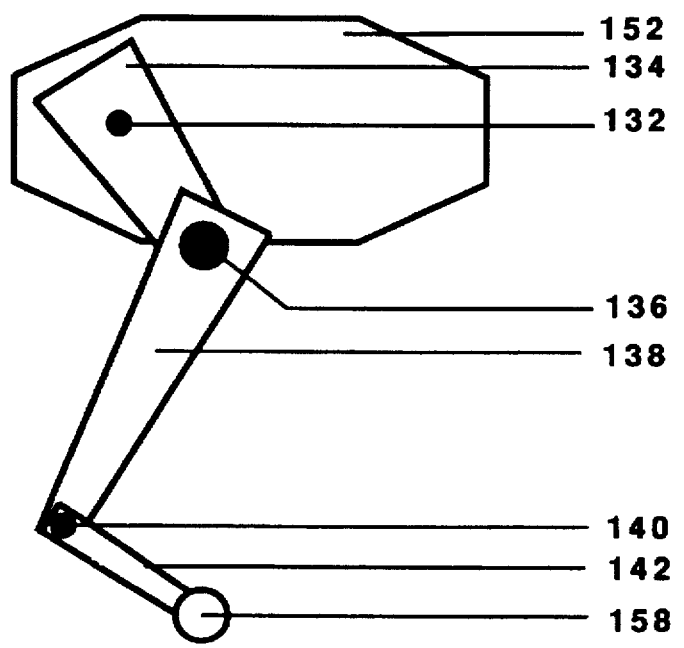
FIG. 14 illustrates the articulated leg of FIG. 12 without construction lines.

As mentioned for FIG. 11, the simplified leg line 146, the balance joint 144, and sliding track 154 are not physically present; rather they exist as geometric construction lines to determine the position and operation of the real joints. In FIG. 14, the construction lines have been removed, and only the actual joints are shown. Note that FIG. 14 appears like the hind leg of a real animal. The three leg joints of FIG. 14 are servo-controlled to take positions equivalent of those of FIGS. 13A, 13B and 13C. This is accomplished by operating the rotational actuators at the hip joint 132, the knee joint 136, and the ankle joint 140 as described for FIG. 11.

Figure 15A:
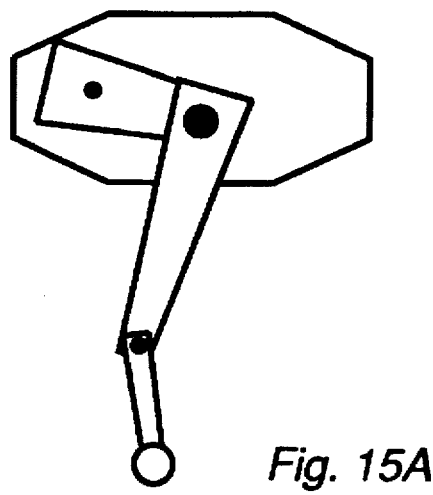
FIGS. 15A–15C illustrate the articulated leg in FIGS. 13A–13C respectively without construction lines.
Figure 15B:
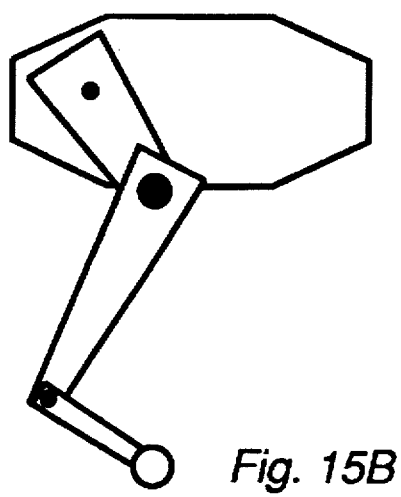
Figure 15C:
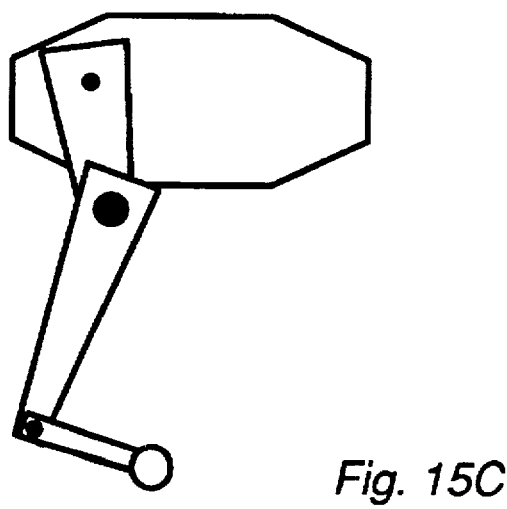

The resulting positions are shown in FIGS. 15A, 15B, and 15C. These have the effect of imparting a pitch-up, neutral, or pitch-down moment, depending upon the position selected, and these positions accomplish these effects by moving the leg in the way that a real animal does. An additional advantage of this method controlling an articulated leg is that balance torques may be applied to the body with substantially smaller transverse forces at the foot than is possible with the hopper mechanism shown in FIG. 1. Transverse forces at the foot cause slip, and it is thus desirable that such transverse forces be minimized. An articulated leg controlled by this method of operation is more resistant to slip and thus capable of operating on steeper slopes and more slippery surfaces than the mechanism illustrated in FIG. 1. The combination of the anti-slip control of this invention and the articulated leg control of this invention results in a system for legged locomotion capable of operation on irregular or slippery terrain. It also results in "animal-like" or "natural" appearing movements.

Of course, the anti-slip control system of the present invention can also be used for the articulated leg of FIG. 11. In this cases, the anti-slip system of this invention limits the amount of transverse force of the foot 158 with respect with a contacting surface in a fashion very similar to that legged hopper previously described.

In the determination and display of the operation of the present invention, a simulation of the operation of the articulated leg system was made in FIGS. 3, 4, 7 and 8. This points to an alternate embodiment of the present invention, a system for the production of animated images of moving legged creatures, including but not necessarily limited to human and animal figures. Such a system has a digital computer, a display device, and software for the generation of images from jointed geometric models, augmented by the techniques described in the previous embodiment implemented as computer programs.

Most computer animation is done by "keyframing", where human animators draw the body positions of the characters at key moments in time and the intermediate frames are filled in by interpolation. The keyframe approach is expensive, time-consuming, and requires highly skilled animators to achieve realistic-appearing motion. Keyframing is not the approach used with this invention. The present invention uses an alternative approach, based on what is known as "physically based modelling and animation".

This type of animation refers to animation in which motion is generated by simulating the action of physical laws on models of objects. A simple example of physically-based animation is a simulation of a bouncing ball, as in FIG. 16. The ball 102 bounces against the ground 104, and the path travelled by the ball 102 is displayed. For animation purposes, each step of the path is rendered as a separate frame, and a movie, video, or real-time graphical display is produced. In the drawing, all the frames have been displayed on one figure.

Figure 16:
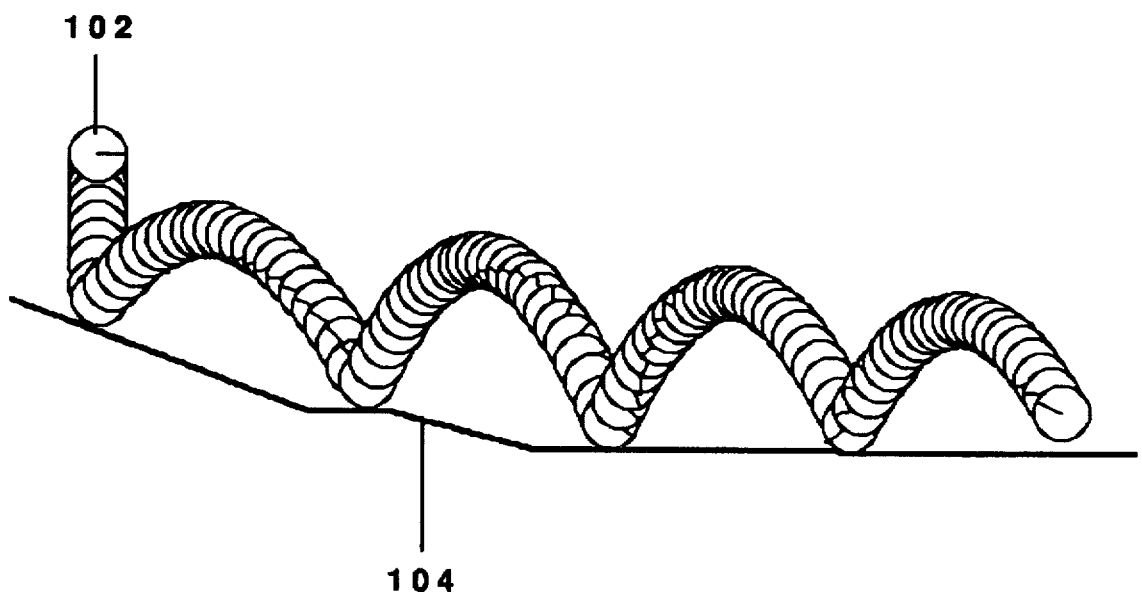
FIG. 16 is a drawing of the simulated motion of a bouncing ball.

The mathematical computations necessary to simulate gravity, inertia, elasticity, and friction, in accordance with the laws of physics, are performed for each time step, and the result is displayed as a series of images, such as shown in FIG. 16. Gravity acts on the ball 102 to accelerate it downward, and it collides with the ground 104. The ball then bounces, with the trajectory of the ball being computed based on the ground angle, speed of the ball, rotation of the ball, coefficient of friction of the ball, coefficient of friction of the ground, coefficients of restitution of the ground and ball, and mass and moment of inertia of the ball. As the ball bounces, it acquires rotation, through simulated friction with the ground. The coefficient of restitution of the ball is less than 1, so energy is lost in each bounce and each bounce is smaller than the previous bounce. Simulation of such simple physics is a common practice in the field of computer graphics.

FIG. 16 was generated with the commercial simulation computer program entitled, "Working Model", a product of Knowledge Revolution, Inc, of San Mateo, Calif. This software program is a simulator for mechanical devices and linkages. It simulates geometric objects, collisions between objects, static and sliding friction, springs, dampers, masses, torque motors, and linear actuators. In the creation of FIG. 16 the ground and ball is drawn, and the properties of each is specified and the simulation may be performed.

However, physically-based modelling and animation systems are not by themselves sufficient for figure animation. Means for controlling the simulated "muscles" actuating the joints of the simulated creatures must be provided. Animation using physically-based modelling with automatic control systems for running has been made. However, such animation only had running on flat surfaces, except for an occasional hop over an obstacle.

Figure 17:
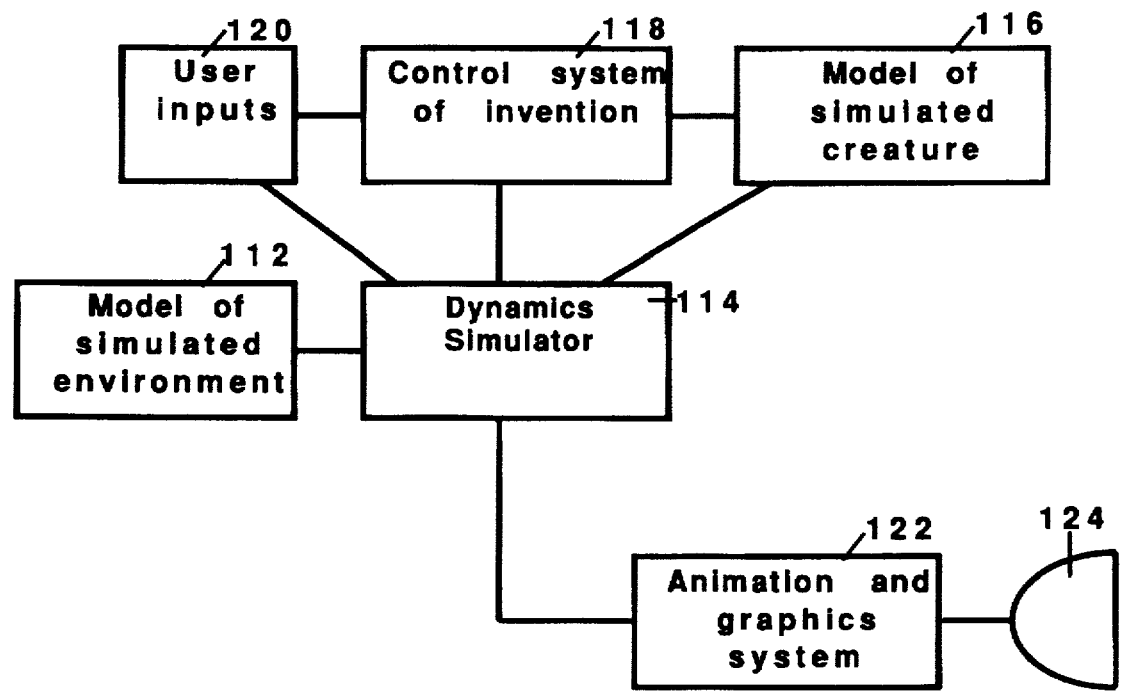
FIG. 17 is a block diagram of a graphics system for animating a dynamic creature.
Figure 19A:
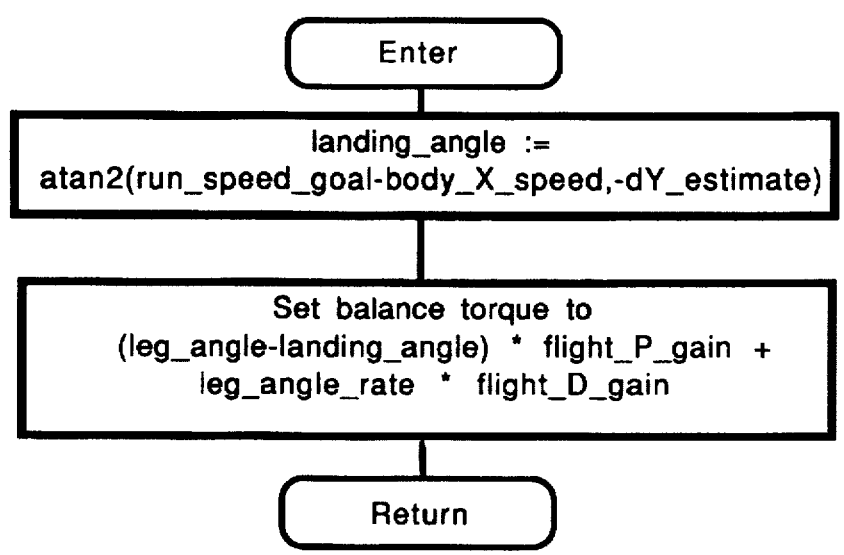
FIG. 19A is a flow chart for determining flight balance for the FIG. 18 operations.

An overview of the process of animation of running, using physically-based modelling and animation, appears as FIG. 17. This description follows generally that in the prior art. The model of the simulated creature 116 consists of data structures which describe the lengths, masses, and joints, and other physical properties of the rigid bodies which make up the legged system. The model of the simulated environment 112 contains data structures which define the terrain being traversed. The dynamics simulator 114 consists of computer programs which compute the equations of motion for the rigid bodies of the legged system, actuator and sensor models expressed as computer programs, and force equations for ground and collision interactions, again expressed as computer programs. The dynamics simulator uses the creature model 116, the environment model 112, the current state of the system, and its own algorithms to compute the positions and velocities of all objects for the next time step. This process is repeated to produce motion over time.

The control system 118 is a control system as described in the first embodiment of this invention, implemented as a computer program. The control system calculates the force or torque to be exerted by each actuator, based on information obtained from the current state of the model. The control calculation is performed once per control interval; 50 ms is a suitable control interval for animations of human-sized creatures.

The user specifies the general desired behavior, which consists of user inputs 120 including desired running speed, the path along which to travel, and other information. In other words, the user steers the creature, but it runs by itself. Alternatively, higher-level behavior control systems can be used to drive the creature. This is useful for creating synthetic "opponents" in video games, as well as for research in "artificial life".

The graphic image is created from the model, using standard computer graphics techniques, by the graphics system 122 and displayed on the display 124. By creating a graphic image once per time step, animations are produced. If the computer system used is fast enough to do this in real time, the process becomes fully interactive. The generation of animated movies does not require real-time speed, but video games, simulators, and virtual reality applications do.

With the control techniques of this invention, and using a suitable physically-based modelling system, animations can be automatically produced for legged creatures running on hills and slippery surfaces. A system for creating such animations may be constructed using simulation software, such as the commercial software described above. For example, the machine described in the first embodiment above is "constructed" within the simulation environment. With the drawing tools of Working Model to draw a diagram such as FIG. 1, a simulated torque motor 28 and a simulated linear actuator 22 are specified. By specifying control equations for the forces and torques to be exerted by the simulated torque motor and simulated linear actuator, in accordance with the flowcharts FIGS. 18 and 19A through 19C, the control system of the first embodiment is input to Working Model.

Figure 18:
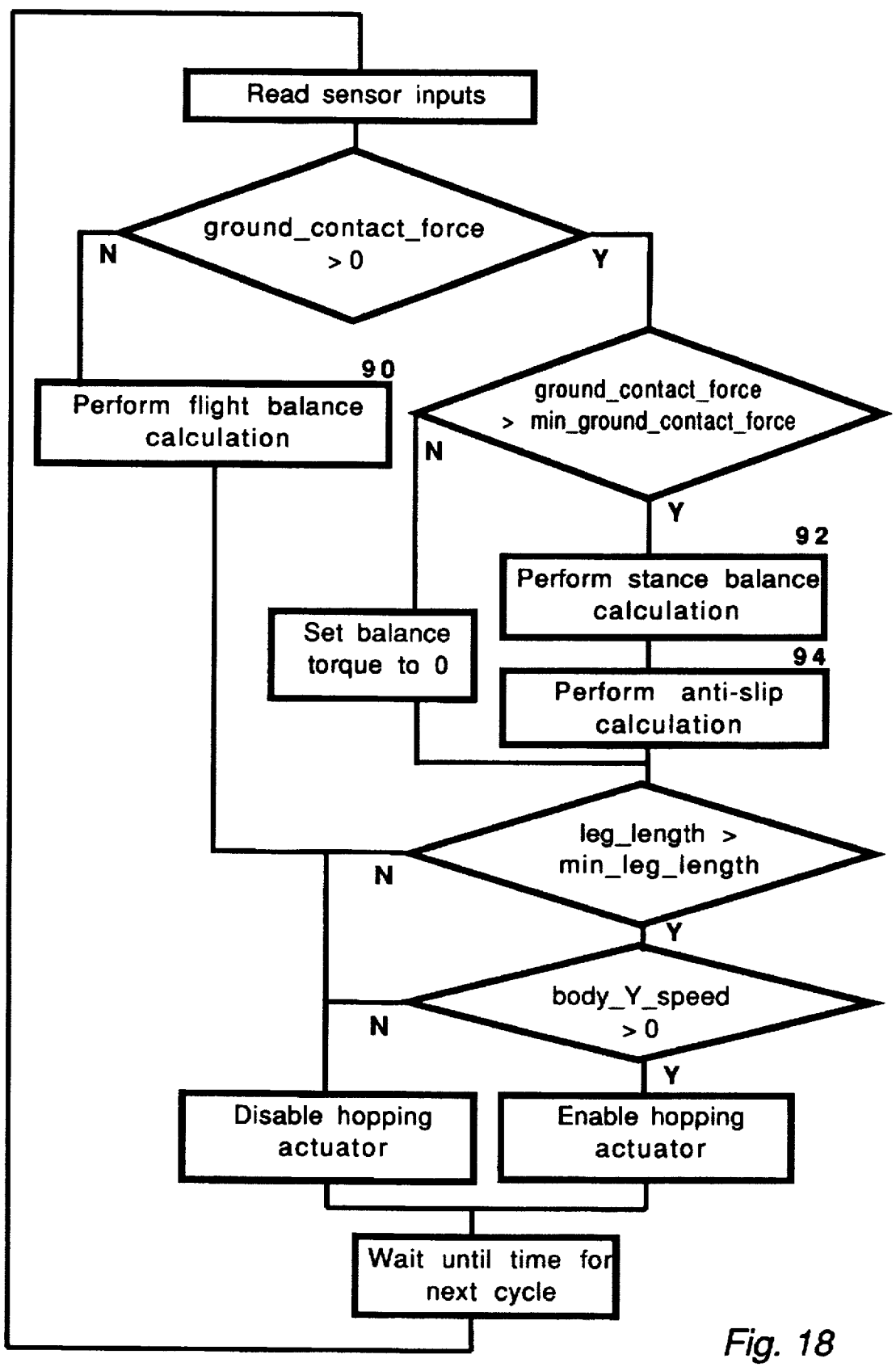
FIG. 18 is a general flow chart of control operations for the FIG. 17 graphics system.
Figure 19B:
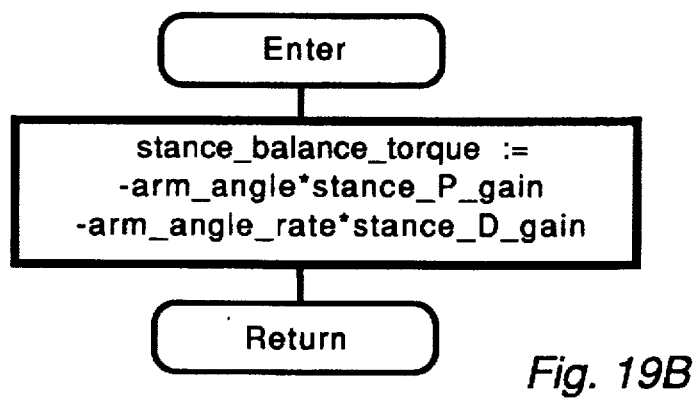
FIG. 19B is a flow chart for determining stance balance for the FIG. 18 operations.
Figure 19C:
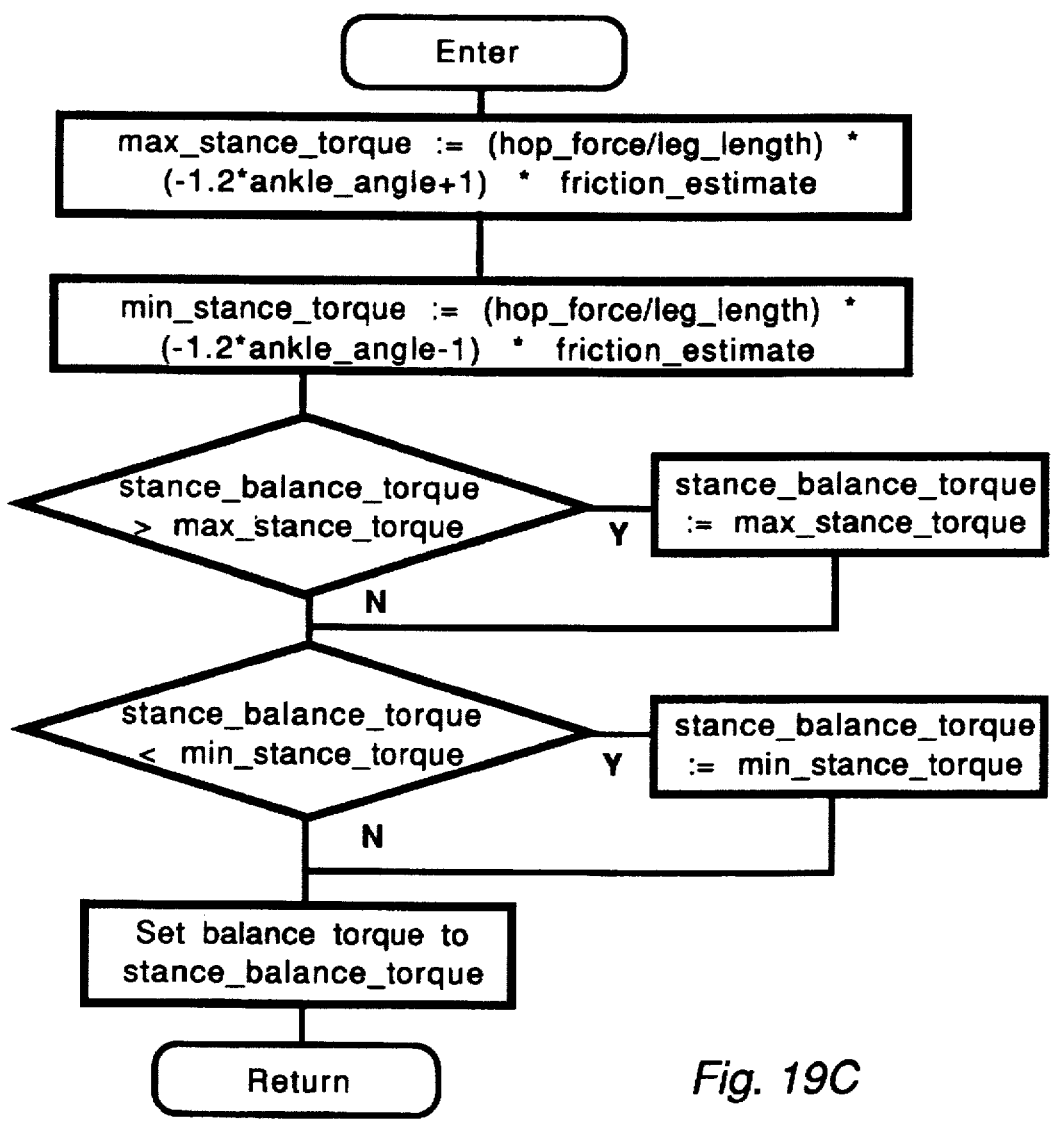
FIG. 19C is a flow chart for computing anti-slip for the FIG. 18 operations.

FIG. 18 is an overview of the computation process, showing the main control loop. The main control loop uses the flight balance computation 90, described in detail in FIG. 19A, the stance balance calculation 92, shown in FIG. 19C, and the anti-slip computation 94, detailed in FIG. 19C. The computational process described is functionally equivalent to the process performed by the control system of the block diagrams illustrated in FIGS. 9, 10A through 10E.

Working Model is then run to generate simulation outputs such as FIGS. 7 and 8. This provides a useful way to safely develop and tune the control algorithms for a running machine before using them on the actual machine.

In addition to generating the static drawings such as FIGS. 7 and 8, animations of legged motion are generated using Working Model. These are displayed on a computer, or output to videotape for later viewing, thus generating an animated movie. Animated movies illustrating this invention have been generated using this technique.

For photorealistic animation, files of joint motion information are exported from Working Model, then imported into commercial animation and rendering systems for high-quality rendering of photorealistic images for entertainment and other purposes. This is also a standard capability of the Working Model program. The animation generated in the Working Model program typically represents a "skeleton" of the creature being animated. The skeleton is then be "dressed" with skin and clothing using a separate animation system, and the resultant creature will then move in accordance with the motions generated by the simulation.

The references to the commercial product Working Model are illustrative; there are other commercial products capable of performing the tasks described. ADAMS/Animator, from Mechanical Dynamics, Inc., of Ann Arbor, Mich., is also suitable.

For animation purposes, it is not strictly necessary that friction be fully simulated to obtain proper movement on slippery and hilly surfaces. The control system of this invention acts to keep a simulated legged creature from moving its simulated legs with a simulated force strong enough to cause slipping. If the estimated friction coefficient K used by the slip control system is set to a low value, such as 0.05, the animated figure behaves as if running on a slippery surface, producing the large arm and body movements characteristic of such running, as shown in FIG. 7. This behavior occurs even if the simulation environment does not simulate friction and slippage between simulated objects. Further, the control system of this invention prevents a simulated legged creature from climbing a simulated hill too steep to be climbed given the physics of the simulated situation.

Such capabilities are especially useful in video game applications involving simulated legged creatures, where the user controls the general direction and speed of a creature while the specific motions of the legs are determined by control applications within the game's computer system. A legged creature can thus be "driven" with vehicle-type control inputs, such as steering and speed. The techniques described in the embodiments above, coupled with the techniques for steering in the prior art, are sufficient to accomplish this task. A block diagram of such an application is shown in FIG. 17.

The invention has applications in any computer animation or simulation application involving the depiction of legged creatures, be they animal, human, robotic, insectoid, or fanciful. These applications include video games, virtual reality systems, military training systems, location-based entertainment systems, interactive television cartoons, and related applications.

Therefore, while the above is a complete description of the preferred embodiments of the invention, various alternatives, modifications and equivalents may be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. A system for the dynamic simulation of a running creature, said system comprising
    data structures defining physical properties of rigid members of said creature, said rigid members including a body and an articulated leg of said creature, and defining an environment for said creature, said environment including a surface to receive said articulated leg of said creature;
    a dynamics simulator defining actuation of said articulated leg with respect to said body and equations of motion of said rigid members of said articulated leg including simulated contact of said articulated leg with said surface, said simulator, responsive to said data structures defining said physical properties of said creature and defining said environment, incrementally determining positions and velocities of said rigid members of said articulated leg and simulated interaction between said surface and said articulated leg upon simulated running by said creature;
    a control system interacting with said dynamics simulator for determining a simulated transverse force of said articulated leg with respect to and in contact with said surface for simulated running by said creature, said control system having means for limiting said transverse force when said leg contacts said surface so that said leg avoids slipping on said surface;
    a graphics system for incrementally generating a image of said creature including said articulated leg; and
    means responsive to said graphics system for displaying said image;
    whereby a realistic dynamic simulation of said running creature is created.

2. The system of claim 1 wherein actuation of said articulated leg with respect to said body and equations of motion of said rigid members of said articulated leg defined by said dynamics simulator includes rotation of said articulated leg about said body; and
    said control system determines simulated torque to simulate rotation of said articulated leg about said axis for simulated running by said creature, said control system having means for limiting said torque when said leg contacts said terrain surface so that said leg avoids slipping on said terrain surface.

3. The system of claim 2 wherein said simulated torque limiting means is responsive to a simulated coefficient of friction between said articulated leg and said surface, a simulated vertical force of said leg upon said surface, a length of said articulated leg from said torque axis, and an angle of said surface with respect to said leg.

4. The system of claim 3 wherein said simulated torque limiting means operates to substantially follow the equations $$T_b < [KF_v/L] \cdot [(-\sin\theta + \cos\theta)/(\cos\theta + \sin\theta)]$$

and $$T_b > [KF_v/L] \cdot [(\sin(-\theta) - \cos(-\theta))/(\cos(-\theta) + \sin(-\theta))]$$

where $T_b$ is the simulated torque, K the simulated coefficient of friction, $F_v$ the simulated vertical force of said foot upon said terrain surface, L length of distance of said leg from said torque axis, and $\theta$ angle of said surface with respect to said leg.

5. A method for the dynamic simulation of a running creature, said method comprising
    defining physical properties of members of said creature, said members including a body and an articulated leg of said creature;
    defining an environment for said creature, said environment including a surface to receive said articulated leg of said creature;
    actuating said articulated leg with respect to said body and equations of motion of said members of said articulated leg including simulated contact of said articulated leg with said surface, responsive to said defined physical properties of said creature and said environment, including incrementally determining positions and velocities of said members of said articulated leg and simulated interaction between said surface and said articulated leg upon simulated running by said creature;
    determining a simulated transverse force of said articulated leg with respect to and in contact with said surface for simulated running by said creature;
    limiting said transverse force when said leg contacts said surface so that said leg avoids slipping on said surface;
    incrementally generating a image of said creature including said articulated leg; and
    displaying said image;
    whereby a realistic dynamic simulation of said running creature is created.

6. The method of claim 5 wherein actuating said articulated leg with respect to said body and equations of motion of said members of said articulated leg defined by said dynamics simulator includes rotating of said articulated leg about said body;
    determining simulated torque to simulate rotation of said articulated leg about said axis for simulated running by said creature; and
    limiting said torque when said leg contacts said terrain surface so that said leg avoids slipping on said terrain surface.

7. The method of claim 6 wherein said simulated torque limiting step is responsive to a simulated coefficient of friction between said articulated leg and said surface, a simulated vertical force of said leg upon said surface, a length of said articulated leg from said torque axis, and an angle of said surface with respect to said leg.

8. The method of claim 7 wherein said simulated torque limiting step operates to substantially follow the equations $$T_b < [KF_v/L] \cdot [(-\sin\theta + \cos\theta)/(\cos\theta + \sin\theta)]$$

and $$T_b > [KF_v/L] \cdot [(\sin(-\theta) - \cos(-\theta))/(\cos(-\theta) + \sin(-\theta))]$$

where $T_b$ is the simulated torque, K the simulated coefficient of friction, $F_v$ the simulated vertical force of said foot upon said terrain surface, L the length of said leg from said torque axis, and $\theta$ angle of said surface with respect to said leg.

9. A method of simulating the movement of an articulated leg of a creature on a terrain surface, said creature having a body attached to said articulated leg, said articulated leg having a foot, said method comprising positioning said foot on said terrain surface;

determining a simulated thrust force exerted against said terrain surface by said articulated leg;

simulating and controlling a rotational moment applied by said leg to said body from said simulated thrust force; and simulating and minimizing a transverse force applied between said foot and said terrain surface to avoid slip therebetween.

10. A method of simulating the movement of a legged creature, comprising defining physical properties of members of said creature, said members including a body and an articulated leg of said creature, said articulated leg having first, second and third joints and first, second and third leg members, said first joint joining said first leg member defining one end of said articulated leg to said body, said second joint joining said first member to said second member, and said third joint joining said second member to said third member defining a second end of said articulated leg;

defining an environment for said creature, said environment including a surface to receive said articulated leg of said creature;

simulating actuation of said articulated leg with respect to said body and equations of motion of said members of said articulated leg responsive to said defined physical properties of said creature and said environment to incrementally determine positions and velocities of said members of said articulated leg, including constraining said first, second, and third joints to operate as if said end of said third member were an end of a leg rod, said rod coupled to a rotating balance joint, said rotating balance joint capable of sliding along a track fixed to said robot body so that the operations of positioning said rotating balance joint along said track, rotating said balance joint, and moving said rod with respect to said balance joint emulates movement of an articulated leg realistically;

incrementally generating an image of said creature including said articulated leg; and displaying said image;

whereby a realistic movement of said leg with respect to said creature body is achieved.

11. The method of claim 10 further comprising the step of simulating said first, second and third joints to respectively correspond to hip, knee and ankle joints for said articulated leg.

12. The method of claim 10 further comprising the step of determining a simulated transverse force of said articulated leg with respect to and in contact with said surface; and wherein in said constraining substep, said positioning, rotating, and moving operations limit said transverse force when said leg contacts said surface so that said leg avoids slipping on said surface.

13. The method of claim 10 wherein in said constraining substep, said positioning, rotating, and moving operations adjust a moment applied to said body by said articulated leg to balance said body.

14. A robot capable of running across a terrain surface, said robot comprising a body;

at least one articulated leg, said articulated leg having a foot for contacting said terrain surface, said articulated leg coupled to said body;

means for applying a transverse force by said foot in contact with said terrain surface;

means for limiting said transverse force by said applying means when said foot contacts said terrain surface so that said foot avoids slipping on said terrain surface;

whereby said robot can run on a difficult terrain surface.

15. The robot of claim 14 wherein said applying means applies a torque on said articulated leg to rotate said leg with respect to said body about an axis; and said limiting means limits said torque by said applying means when said foot contacts said terrain surface so that said foot avoids slipping on said terrain surface.

16. The robot of claim 15 wherein said torque limiting means is responsive to a determined coefficient of friction between said foot and said terrain surface, a vertical force of said foot upon said terrain surface, a length between said foot and said torque axis, and an angle of said terrain surface with respect to said leg.

17. The robot of claim 16 further comprising means for determining said coefficient of friction between said foot and said terrain surface.

18. The robot of claim 16 wherein said torque limiting means substantially follows the equations $$T_b < [KF_h/L] \cdot [(-\sin \theta + \cos\theta)/(\cos\theta + \sin \theta)]$$

and $$T_b > [KF_h/L] \cdot [(\sin(-\theta) - \cos(-\theta))/(\cos(-\theta) + \sin(-\theta))]$$

where $T_b$ is the torque, K the coefficient of friction, $F_h$ the vertical force of said foot upon said terrain surface, L the length of said foot from said torque axis, and $\theta$ angle of said terrain surface with respect to said leg.

19. A method of operating a robot having a body, at least one articulated leg, said articulated leg having first, second and third members, said third member for contacting a terrain surface, said first member coupled to said body by a first joint, said second joint joining said first member to said second member, and said third joint joining said second member to said third member having an end removed from said third joint, and actuators of said first, second and third joints, said method comprising constraining said first, second, and third joints to operate as if said end of said third member were an end of a leg rod, said rod coupled to a rotating balance joint, said rotating balance joint capable of sliding along a track fixed to said robot body so that the operations of positioning said rotating balance joint along said track, rotating said balance joint, and moving said rod with respect to said balance joint, minimize a transverse force of said third member with respect to said terrain and adjust a moment applied to said body by said articulated leg to balance said body.

20. The method of claim 19 further comprising the steps of operating said first, second and third joints to apply a transverse force by said third member in contact with said terrain surface; and limiting said transverse force when said foot contacts said terrain surface so that said foot avoids slipping on said terrain surface.

21. The method of claim 19 further comprising the step of simulating said first, second and third joints to respectively correspond to hip, knee and ankle joints for said articulated leg.

22. A method of operating the movement of an articulated leg of a robot on a terrain surface, said robot having a body attached to said articulated leg, said articulated leg having a foot, said method comprising positioning said foot on said terrain surface;

determining a thrust force exerted against said terrain surface by said articulated leg;

controlling a rotational moment applied by said leg to said body from said thrust force; and minimizing a transverse force applied between said foot and said terrain surface to avoid slip therebetween.

* * * * *

UNITED STATES PATENT AND TRADEMARK OFFICE
CERTIFICATE OF CORRECTION

PATENT NO. : 5,644,204
DATED : July 1, 1997
INVENTOR(S) : John Nagle

It is certified that error appears in the above-indentified patent and that said Letters Patent is hereby corrected as shown below:

On the title page, item [54] and column 1, line 2, delete "REALISITC" and insert --REALISTIC--.

Signed and Sealed this

Second Day of September, 1997

Attest:

BRUCE LEHMAN

Attesting Officer

Commissioner of Patents and Trademarks